Patented Jan. 13, 1942

2,269,531

UNITED STATES PATENT OFFICE 2,269,531

PROCESS OF PREPARING DYESTUFFS OF THE DIOXAZINE SERIES

Heinrich Greune, Frankfort - on - the - Main, Gerhard Langbein, Hofheim, Taunus, and Max Thiele, Frankfort-on-the-Main, Germany, assignors to General Aniline & Film Corporation, New York, N. Y., a corporation of Delaware No Drawing. Application June 26, 1940, Serial No. 342,502. In Germany July 12, 1939

4 Claims. (Cl. 260—246)

The present invention relates to a process of preparing dyestuffs of the dioxazine series, more particularly it relates to the manufacture of dyestuffs of the dioxazine series containing carboxylic acid groups by heating a dioxazine compound containing sulfonic acid groups and at least one substituent of the group consisting of the carboxylic acid group and groups which are capable of being transformed into the carboxylic acid group: such as the nitrile, carboxylic acid ester, carboxylic acid amide or carboxylic acid chloride group, with an aqueous mineral acid, until a test shows that a sample which is washed neutral is no longer soluble in hot water but is soluble in dilute aqueous alkali. By this treatment the sulfonic acid groups present in the dioxazine compound are split off and any saponifiable groups which may be present are simultaneously saponified to the carboxylic acid group.

In some cases it is possible to split off the sulfonic acid groups by heating the said dioxazine compounds in an organic solvent or diluent in the presence or absence of a metal chloride or an acylating agent.

The dyestuffs thus obtained are insoluble in water in the form of their free carboxylic acids. The alkali metal salts of the dioxazine carboxylic acids are soluble in water and are suitable for the dyeing of vegetable, artificial and animal fibers and of mixed fabrics of such fibers. The dyeings are distinguished from the dyeings prepared by means of the corresponding dioxazine carboxylic acids containing sulfonic acid groups by a better fastness to wet-processing and a better absorbing capacity.

In the form of the barium, calcium or other insoluble salts the dyestuff carboxylic acids may also be used as pigments.

The following examples serve to illustrate the invention, but they are not intended to limit it thereto, the parts being by weight:

(1) 10 parts of the dyestuff sulfonic acid, obtainable by treating 2.5-di-(4''-carboxy-2'-sulfodiphenyl-amine-4'-amino)-3.6-dichloro-1.4-benzoquinone at room temperature with fuming sulfuric acid of 20 per cent strength, are heated for 3-4 hours to 140° C.-145° C. in 300 parts of sulfuric acid of 70 per cent strength. After cooling the whole is diluted with water, the dyestuff is filtered with suction and washed with hot water until neutral. The dyestuff is then dissolved in water by adding a sufficient quantity of sodium carbonate, the alkali metal salt thus formed is salted out with sodium chloride, the dyestuff is filtered with suction, washed with dilute sodium chloride solution until neutral and dried.

The sodium salt thus obtained dissolves in water to a blue solution. From a neutral solution or from a bath containing an addition of sodium carbonate it dyes vegetable and artificial fibers clear blue tints of excellent fastness properties.

A similar dyestuff is obtained by treating in the same manner the dyestuff obtainable by the treatment of 2.5-di-(4''-carbethoxy-diphenylamine-4'-amino)-1.4-benzoquinone with fuming sulfuric acid.

(2) 10 parts of the dyestuff sulfonic acid, obtainable by the treatment of 2.5-di-(4''-carboxy-2'-sulfodiphenylamine-4'-amino)-3.6-dichloro-1.4-benzoquinone at 40° C. with fuming sulfuric acid of 20 per cent strength, are heated in a closed vessel in 100 parts of concentrated hydrochloric acid for 10 hours to 160° C.–170° C. After cooling the product is further treated as described in Example 1. The dyestuff obtained is identical with that of Example 1.

(3) 10 parts of the dyestuff sulfonic acid, obtainable by the treatment of 2.5-di-(3''-carboxy-2'-sulfodiphenylamine-4'-amino)-3.6-dichloro-1.4-benzoquinone at 45° C. with fuming sulfuric acid of 20 per cent strength, are heated to boiling in 300 parts of sulfuric acid of 70 per cent strength until a test shows that a sample taken up in water, after having been filtered, no longer dissolves on washing with water. The dyestuff is further treated as it is described in Example 1. It dyes cotton and viscose fast clear blue tints.

A similar dyestuff is obtained if the condensation product from 1 mol of benzoquinone and 2 mols of 4-aminodiphenylamine-2-sulfo-3'-carboxylic acid (obtainable by the reaction of the components in alcohol or water in the presence of an acid-binding agent) is treated as described above with fuming sulfuric acid of 20 per cent strength and the sulfonic acid groups are split off by heating the product with dilute sulfuric acid.

(4) 10 parts of the dyestuff sulfonic acid, obtainable by the treatment of 2.5-di-(6'-carboxynaphthyl-2'-amino)-3.6-dibromo-1.4-benzoquinone at 170° C. with sulfuric acid of 100 per cent strength, are heated to boiling for several hours in 300 parts of sulfuric acid of 55 per cent strength. After cooling the whole is diluted with water and further treated as described in Example 1.

The dyestuff obtained dyes artificial and vegetable fibers violet tints of good properties of fastness.

(5) 10 parts of the dyestuff sulfonic acid, obtainable by the treatment of 2.5-di-(6'-carbmethoxy-N-ethylcarbazolyl-3'-amino)-3.6-dichloro-1.4-benzoquinone at 120° C. with fuming sulfuric acid of 20 per cent strength, are stirred in 300 parts of sulfuric acid of 60 per cent strength for some hours at 130° C.–140° C. After cooling the dyestuff is worked up as described in Example 1. The sodium salt of the dyestuff carboxylic acid obtained dyes vegetable and artificial fibers blue tints.

(6) 10 parts of the dyestuff obtainable from 2.5 - di - (3' - carboxy - 4'' - sulfo-azobenzene-4'-amino)-3.6-dibromo-1.4-benzoquinone by treatment at 200° C. with sulfuric acid of 100 per cent strength, are heated to boiling in 300 parts of sulfuric acid of 55 per cent strength for 2–3 hours in a reflux apparatus. The whole is cooled and then worked up as described in Example 1.

The dyestuff obtained dyes cotton or artificial fibers fast grey-blue tints.

(7) 10 parts of the dyestuff sulfonic acid, obtainable by the treatment of 2-(N-ethyl-carbazoyl-3'-amino)-5-(3''.4'' - dicarbethoxy-anilido)-3.6-dichloro-1.4-benzoquinone at 150° C.–160° C. with sulfuric acid of 100 per cent strength, are heated in 300 parts of sulfuric acid of 60 per cent strength for several hours to 140° C. After cooling the whole is worked up as described in Example 1. The dyestuff obtained dyes cotton violet tints.

(8) 60 parts of 2.5-di-(3''-carboxy-2'-sulfodiphenylamine-4' - amino)-3.6-dichloro-1.4-benzoquinone are heated to boiling in 1000 parts of nitrobenzene while adding 18 parts of paratoluene-sulfochloride. After the dioxazine has been formed boiling is continued until a test shows that the dyestuff is no longer soluble in water. After cooling, the reaction mass is diluted with a small quantity of alcohol in order to facilitate the separation of the dyestuff formed; it is then filtered with suction and washed with alcohol and water. The dyestuff is dissolved in a dilute sodium carbonate solution, its sodium salt is precipitated with sodium chloride, the dyestuff is filtered with suction, washed with sodium chloride solution until neutral and dried.

The sodium salt of the dyestuff dissolves in water to a blue solution and from a neutral bath or from a bath containing sodium carbonate it dyes vegetable and artificial fibers clear blue tints of excellent fastness properties.

We claim:

1. The process which comprises heating a dioxazine compound containing sulfonic acid groups and at least one substituent of the group consisting of the carboxylic acid group and groups which are saponifiable to the carboxylic acid group in an aqueous mineral acid until a test shows that a sample which is washed neutral is no longer soluble in hot water but is soluble in dilute aqueous alkali.

2. The process which comprises heating the dioxazine sulfonic acid compound (obtainable by treating 2.5 - di - (4''-carboxy-2'-sulfodiphenylamine-4'-amino)-3.6-dichloro-1.4- benzoquinone at room temperature with fuming sulfuric acid of 20 per cent strength) in aqueous sulfuric acid of 70 per cent strength at a temperature of substantially 140° C.–145° C. for about 3 to 4 hours.

3. The process which comprises heating the dioxazine sulfonic acid compound (obtainable by treating the dimethylester of 2.5-di-(6'-carboxy-N-ethylcarbazolyl-3'-amino)-3.6-dichloro - 1.4-benzoquinone at 120° C. with fuming sulfuric acid of 20 per cent strength) in aqueous sulfuric acid of 60 per cent strength at substantially 130° C.–140° C. for some hours.

4. The process which comprises boiling 2.5-di-(3''-carboxy-2'-sulfodiphenylamine-4' - amino)-3.6-dichloro-1.4-benzoquinone in nitrobenzene in the presence of para-toluene-sulfochloride until a test shows that a sample which is washed neutral is no longer soluble in hot water but is soluble in dilute aqueous alkali.

HEINRICH GREUNE.
GERHARD LANGBEIN.
MAX THIELE.